United States Patent Office 2,886,186
Patented May 12, 1959

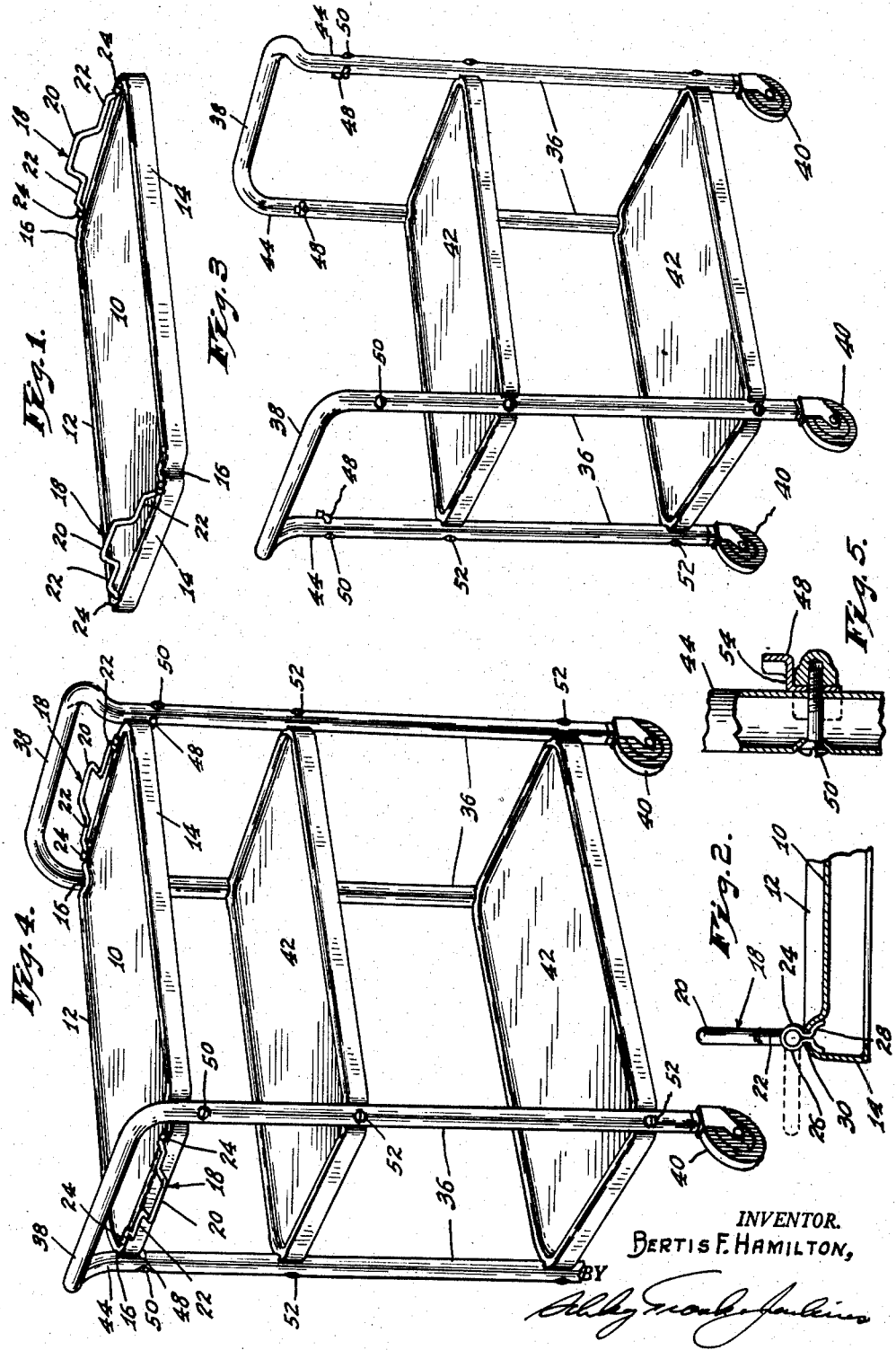
INVENTOR.
BERTIS F. HAMILTON,
BY
ATTORNEYS.

2,886,186
SERVING TRAY AND CART

Bertis F. Hamilton, Columbus, Ind.; William S. Hamilton, executor of said Bertis F. Hamilton, deceased, assignor to Hamilton Manufacturing Corporation, Columbus, Ind., a corporation of Indiana Application August 24, 1953, Serial No. 375,968

1 Claim. (Cl. 211—126)

This invention relates to movable utility carts, and more particularly to carts of the type used in the kitchenware line of metal furniture.

It is an object of this invention to provide a serving tray and a shelved cart adapted for conventional use separately as two specific pieces of kitchenware but alternatively for service in combination wherein the cart and tray co-operate to form a utility cart of integrated appearance and giving little or no indication of capability of disassociation and separate function. Another object is the provision of such a tray and cart made of economical sheet-metal, metal-tube, and metal-rod construction, which is convenient to assemble and is of attractive appearance.

In carrying out my invention in a preferred embodiment, I provide a cart having legs formed in end pairs, each pair formed from a tubular-metal leg-forming member having a general shape of an inverted U whose legs serve as the cart legs and whose intermediate portion serves as a brace and as a push-bar for the table. At intermediate and at low elevations of such legs, I rigidly connect to such legs a pair of shelves which position the leg pairs in vertical planes, with the upper portions of the legs extending well above the higher of the two shelves. To co-operate with such a cart, I provide a serving tray formed to possess an appearance similar to that of the cart-shelves, and having at or near both ends handles for use when the tray is disassociated from the cart. Near the top of each of the cart legs, I provide means for seating this tray, and when the tray is seated thereon the overall visual effect is that of a three-shelved cart of integral structure. The tray perimeter has recessed provisions which interfit with the upstanding cart-legs, thereby removably fixing the tray horizontally on the cart. By providing that the tray-handles may rotate from an operative, upraised position to a retracted position extending horizontally outward from the tray, and by using leg-forming members whose push-bar-portion is formed with an outward disposition under which the handles in retracted position lie, I render the handles relatively inconspicious and thus tend to conceal the dual-operability of the parts. Other objects and features will become apparent from the following description:

Fig. 1 is an isometric view of the serving tray;

Fig. 2 is a longitudinal section through an end of the tray;

Fig. 3 is an isometric view of the cart;

Fig. 4 is an isometric view of the cart with the tray mounted thereon; and

Fig. 5 is a fragmental section taken through a leg of the cart.

My invention as illustrated comprises a serving tray 10 of rectangular shape having a raised peripheral edge 12 from which depend peripheral walls 14 for stiffening the tray. At or near each tray-corner such walls 14 are formed to provide an outwardly open vertical groove 16 for purposes of interfitting with cart-legs yet to be described. At each of its ends, the tray is provided with a handle 18, each handle being conveniently made of metal rod and formed to provide an intermediate grasping-portion 20 of U-shape the legs of which are outwardly bent to provide generally co-axial fingers 22 rotatably received in handle-bearings 24 provided on the tray. Desirably, each of said bearings comprises a short strip of sheet-metal bent back on itself to provide intermediately a circular bight or sleeve-portion 26 having juxtaposed legs 28 extending therefrom. Transversely extending slots 30 are provided in appropriate locations of the tray; and in assembly, the bearing-legs 28 are inserted through such slots and the legs are then spread apart to affix the bearings to the tray. Desirably also, the axes of the sleeve portions 26 and fingers 22 are slightly out of line, to assist in the maintenance of a fit tight enough that the handles will not freely rotate.

The cart comprises four upstanding legs 36 conveniently formed from two lengths of metal-tubing, each length being bent into a general U-shape to provide two adjacent cart-legs 36 interconnected by a transverse medial portion 38 which braces the cart and serves as a push-bar from the cart. Thus, as shown, the legs are formed as end-pairs, all legs extending vertically from casters 40 upward to the push-bars 38.

Interconnecting such legs at low and at intermediate elevations are cart-shelves 42, each of which is similar both to the other cart-shelf and to the serving-tray 10 above described. Being well-spaced vertically, and each having a depending peripheral flange 44 which engages the leg for an appreciable vertical extent, the two cart-shelves 42 fix the leg members 36 vertically. The portions of legs 36 above the higher of shelves 42 form corner posts 44 which extend well above such higher shelf 42 for a purpose hereinafter apparent.

On such corner-post-portions 44 of the legs 36, but below the top thereof, I provide means such as the brackets 48 shown for supporting the serving tray 10. A convenient form for such brackets 48 is as shown in Fig. 3, each bracket being a sheet-metal stamping having a leg-engaging portion punched to receive a bracket-holding screw 50, and inwardly extending therefrom a seat-portion 54 upon which the tray 10 may be placed. When the tray 10 is in position on such brackets 48, the vertically extending grooves 16 of the tray periphery interfit with the cart legs 36 to position the tray horizontally on the cart. The screws 50 which affix the brackets 48 to the corner posts 44 desirably have heads of the same type and size as the heads of screws 52 which connect the cart-shelves 42 to the legs, to further the appearance that the tray 10 is but a third and structurally-integral shelf of the cart.

In using the cart for purposes such as transporting food from one room to another, the tray 10 is placed upon the brackets 48; and when so combined, the tray 10 and cart mutually co-operate to effect an overall appearance like that of a three-shelved cart. With the parts so arranged, the cart and tray may be wheeled to a desired location. When desired the tray 10 may be lifted off the cart by grasping the handles 20, the accessibility of such handles 20 from above being aided by the out-bent formation of the push-bars 38. A slight upward pull on the handles swings them to erect position and conveniently accessible inwardly of the push-bars 38 under which they had been effectively concealed.

While I have shown and described a specific embodiment of my invention, I intend to cover all changes and modifications of the example herein chosen for the purpose of disclosure, which do not constitute departures from the spirit and scope of the appended claim.

I claim as my invention:

In a serving cart, a pair of end members each comprising a length of metal tubing bent into the form of an inverted U to provide parallel, vertical legs and a horizontal intermediate portion interconnecting said legs at their upper ends, a pair of generally rectangular shelves formed at their corners to fit against said legs, means for securing said shelves rigidly to said legs in vertically spaced relation to interconnect said end members, tray-supporting abutments secured to said legs above the uppermost shelf and below the intermediate portions of the end members, a removable tray positioned on said abutments and being freely vertically movable into and out of supported engagement with said abutments, said tray being provided at its ends with handles each pivotally mounted on a horizontal axis transverse to the tray and swingable between a vertical position in which it lies wholly inwardly of the tray-end and a generally horizontal position in which it projects outwardly beyond the tray-end, said legs above said abutments being bent outwardly to position the intermediate portions of the end members over and in protecting relation to said handles when the handles are in their horizontal positions.

References Cited in the file of this patent

UNITED STATES PATENTS

| Number | Name | Date |
|---|---|---|
| 359,691 | Reed | Mar. 22, 1887 |
| 681,098 | Brown | Aug. 20, 1901 |
| 914,572 | Holden | Mar. 9, 1909 |
| 1,056,486 | Bales | Mar. 18, 1913 |
| 1,545,165 | O'Connor | July 7, 1925 |
| 1,562,089 | Holley | Nov. 17, 1925 |
| 1,630,471 | Collins | May 31, 1927 |
| 1,709,928 | Whitney | Apr. 23, 1929 |
| 1,854,777 | Bales | Apr. 19, 1932 |
| 2,001,438 | Stuck | May 14, 1935 |
| 2,011,125 | Small | Aug. 13, 1935 |
| 2,141,881 | Schray | Dec. 27, 1938 |
| 2,502,526 | Loewen | Apr. 4, 1950 |
| 2,573,305 | Bronstein | Oct. 30, 1951 |
| 2,601,190 | Wells | June 17, 1952 |

FOREIGN PATENTS

| Number | Country | Date |
|---|---|---|
| 263,219 | Great Britain | Dec. 20, 1926 |

OTHER REFERENCES

Cosco Utility Cart-Model 8F, Housewares Review, Jan. 1951, page 29, item D (Copy in Design Div.).